S. H. ST. JOHN.
BARBED FENCE.

No. 249,418.  Patented Nov. 8, 1881.

Witnesses:
W. B. Masson
Robert Lynch

Inventor:
Spencer H. St John.
by L. Deane.

UNITED STATES PATENT OFFICE.

SPENCER H. ST. JOHN, OF CEDAR RAPIDS, IOWA.

BARBED FENCE.

SPECIFICATION forming part of Letters Patent No. 249,418, dated November 8, 1881.

Application filed January 12, 1880.

*To all whom it may concern:*

Be it known that I, SPENCER H. ST. JOHN, of the city of Cedar Rapids, in the county of Linn and State of Iowa, have invented certain new and useful Improvements in Barbed Wire, of which the following is a specification.

My object is to produce a barb for wire fence that shall adhere with great firmness to the fence-wire, a comparatively small portion of said barb being in contact therewith, but little material required in its manufacture, and of such form as to be rapidly and cheaply made.

Figure 1:
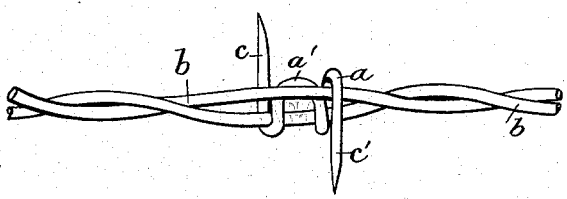
Figure 2:
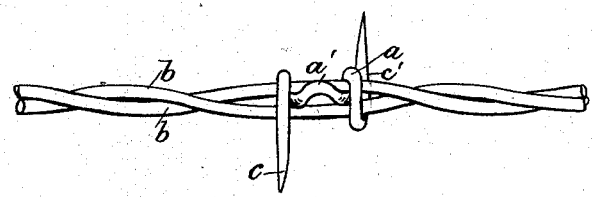
Figure 3:
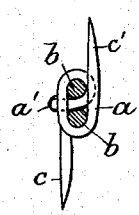

In the accompanying sheet of drawings, forming part of this specification, Figures 1 and 2 represent perspective views of the barbed wire; Fig. 3, a transverse section of the same, and Fig. 4 the staple from which the barb is formed.

Figure 4:
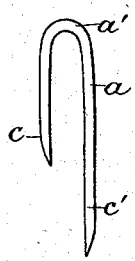

The manner of constructing the barb is so simple and so clearly shown in the drawings as to require but little explanation. The barb $a$ is first formed into a two-pointed staple, as shown in Fig. 4, having one prong longer than the other. The loop $a'$ of this staple is placed between the two wires $b$ $b$, which constitute the fence-cable, and both prongs are then turned around one of the wires in the same direction. The one prong, $c$, only encircles one wire and stops when it reaches the other. The remaining and longer prong, $c'$, is carried on around the second wire, encircling both completely, and when finished the points of the barb stand in opposite directions. The result is a light, open, and strong barb, which by reason of its peculiar form adheres with extreme tenacity to the main wires.

It will be noticed by reference to Fig. 2 that the prongs of the barb lie on both sides of the fence-wires, on a line with their widest expansion, and bear firmly upon said wires. This effectually prevents the barb from turning and becoming loose. The rigidness of the barb is still further increased through the operation of the loop therein. This separates the respective prongs and their place of contact with the main wires, and, in consequence, the barb stands bracing, so that it is impossible to move it by any amount of wringing and twisting, laterally or otherwise. Nothing less than actual unwinding of the barb can move it from its place upon the fence-wire.

The openness of the barb is also an essential feature. Water does not accumulate upon it in such quantities as it would if the barb were heavy and compact, and a better opportunity is given such as does collect here to dry out. The wire is thereby rendered much more durable.

A saving is made in material for the barb by having but one prong encircle both wires. This is sufficient to draw both of the main wires near together and closely in contact with the barb, while the other prong, removed to a short distance and inclosing one wire, so braces and strengthens the barb as to make it immovable.

It will also be noticed that the twisting of the main wires does not increase the tenacity of the barb. It remains firmly in place whether the wires be twisted or not. Therefore it is impossible for the barbs to become detached through the untwisting of these wires, being unlike, in this respect, many of the inventions in use. Indeed, it will be found that, in case of the accidental breaking of one strand, the barb will still hold them together, and the fence will not sustain material injury.

The barb may be applied by hand or machinery. When attached by the latter method the barb is altogether formed and fastened to the wires in one operation and by a very rapid and inexpensive process. My invention therefore realizes a minimum of expense in its manufacture with a maximum degree of strength, tenacity, and effectiveness.

Having thus briefly described my invention, what I claim as new, and desire to secure by Letters Patent, is—

A barb for wire fencing, consisting of the staple $a$, having unequal prongs intertwisted between the cable-wires $b$, so that its loop $a'$ projects directly between the cable-wires and stays the barb, while the ends $c$ and $c'$ of the barb point outwardly from the cable in opposite directions, thus binding the barb in and upon the wire, substantially as set forth and described.

In testimony whereof, witness my hand this 29th day of December, A. D. 1879.

SPENCER H. ST. JOHN.

In presence of—
J. M. ST. JOHN,
FRANK G. CLARK.